(12) United States Patent
Kawano

(10) Patent No.: US 7,216,969 B2
(45) Date of Patent: May 15, 2007

(54) IMAGE RECORDING METHOD

(75) Inventor: Kenichi Kawano, Mitsukaido (JP)

(73) Assignee: Canon Finetech Inc., Mitsukaido-shi (JP)

( * ) Notice: Subject to any disclaimer, the term of this patent is extended or adjusted under 35 U.S.C. 154(b) by 258 days.

(21) Appl. No.: 10/518,076

(22) PCT Filed: Dec. 11, 2003

(86) PCT No.: PCT/JP03/15893

§ 371 (c)(1),
(2), (4) Date: Dec. 16, 2004

(87) PCT Pub. No.: WO2004/067287

PCT Pub. Date: Aug. 12, 2004

(65) Prior Publication Data

US 2005/0212885 A1    Sep. 29, 2005

(30) Foreign Application Priority Data

Jan. 28, 2003   (JP)   ............... 2003-019179
Jan. 29, 2003   (JP)   ............... 2003-021052
Jan. 30, 2003   (JP)   ............... 2003-022504

(51) Int. Cl.
*B41J 2/01* (2006.01)
(52) U.S. Cl. ............... 347/105; 347/100; 347/101
(58) Field of Classification Search ............... 347/105, 347/101, 100, 95, 96; 428/195, 32.1
See application file for complete search history.

(56) References Cited

U.S. PATENT DOCUMENTS 5,145,518 A * 9/1992 Winnik et al. ............... 347/100
6,281,267 B2   8/2001 Parazak
2002/0008753 A1 * 1/2002 Suzuki et al. ............... 347/106
2002/0182378 A1 * 12/2002 Ishida et al. ............... 428/195

FOREIGN PATENT DOCUMENTS

| EP | 1 034 940 A1 | 9/2000 |
| EP | 1 201 719 A1 | 5/2002 |
| EP | 1 285 948 A2 | 2/2003 |
| JP | 63-224988 A | 9/1988 |
| JP | 64-9279 A | 1/1989 |
| JP | 64-063185 | 3/1989 |
| JP | 63-29971 A | 11/1994 |
| JP | 11-269418 A | 10/1999 |
| JP | 2001-139026 A | 5/2001 |
| JP | 2002-086905 | 3/2002 |
| JP | 2002-302627 A | 10/2002 |

* cited by examiner

*Primary Examiner*—Manish S. Shah
(74) *Attorney, Agent, or Firm*—Harness, Dickey & Pierce, P.L.C.

(57) ABSTRACT

An image recording method for causing an ink to adhere on a recording medium, which provides with at least one ink-receiving layer on a base material to form an image. The ink is an inkjet recording ink, which composed of a high molecular dispersant, a water-insoluble colorant, a water-soluble organic solvent and water. The high molecular dispersant contains at least one hydrophobic block and at least one hydrophilic block. The ink receiving layer contains fine inorganic particles and a water soluble resin or water dispersible resin, and a surface pH of the ink receiving layer is controlled within a range of from 3.0 to 6.5, wherein said fine inorganic particles are made of at least one selected from the group consisting of aluminum hydrate of boehmite structure and aluminum hydrate of the pseudo-boehmite structure each of which has an average particle size of from 100 to 300 nm.

14 Claims, No Drawings

IMAGE RECORDING METHOD

TECHNICAL FIELD

This invention relates to an image recording method suitable for inkjet recording. More specifically, the present invention is concerned with a method for recording an image by causing a colorant dispersion ink, which contains a high-molecular dispersant formed of a block copolymer composed of at least one hydrophobic block and at least one hydrophilic block, to adhere on a recording medium having an ink-receiving layer the surface pH of which has been controlled to a range of from 3.0 to 6.5, and then causing the high-molecular dispersant to agglomerate and deposit such that the ink is fixed.

BACKGROUND ART

Inkjet recording is a recording technique that performs recording of an image, characters or the like by causing tiny droplets of ink to fly in accordance with one of various operation principles and then allowing them to adhere on a recording medium such as paper. Inkjet recording features high-speed printing performance, low operating noise, applicability for the recording of a wide variety of characters and patterns, easy multicolor printing, and obviation of development and image fixing. In particular, an image formed by multicolor inkjet recording can provide a record which is no way inferior to an image printed by multicolor printing making use of a form-plate-dependent printing technique or by a color photographic technique. Multicolor inkjet recording has a still further merit in that, when the number of copies or prints to be made is small, it requires lower printing cost than an ordinary printing technique or photographic technique. Multicolor inkjet recording is, therefore, rapidly finding wide-spread utility as image recorders for various information equipment in recent years. For example, multicolor inkjet recording is finding increasing utility in a wide variety of fields in which recording of full-color images is required, for example, output of image designs in design business, production of color block copies in a printing field where the quality of photographic images is required, and production of billboards and catalogs which are frequently updated.

Further, owing to the spreading of digital still cameras and computers, there are greater opportunities to output photographic images simply by inkjet printers. From such a background, images recorded by inkjet printers are required to have high resolution and vividness equivalent to silver halide pictures, leading to demands for recording apparatuses, recording media and inks of higher performance.

As inks loaded on inkjet printers these days, those using as colorants water-soluble dyes excellent in color developing ability constitute the mainstream. However, a water-soluble dye has high hydrophilicity so that, when an image is stored under high humidity for a long time or water drops adhere a recorded surface subsequent to recording of the image with such an ink, the dye with which the image is formed tends to bleed. Further, use of a water-soluble dye ink, especially on a recording medium having a porous ink-absorbing layer makes it possible to obtain an unblurred uniform image, but involves a problem that subsequent to the recording, the image is prone to fading.

To overcome these problems, water-based dispersion inks are finding utility. Each of these water-based dispersion inks contains a water-insoluble colorant, such as a pigment, dispersed in water by using a hydrophilic high-molecular compound and a surfactant. Images formed with these inks are excellent in light fastness, waterproofness and ozone resistance. For high image fastness, these inks are therefore attracting interests as replacements for dye inks.

Compared with dye inks, however, water-based dispersion inks with pigments contained therein are lower in tinting efficiency so that they are required in greater amounts to record images. This means that these water-based dispersion inks require recording media excellent in ink absorbency. With a recording medium with an ink-receiving layer simply rendered thick to provide improved ink absorbency, however, the colorant penetrates deep into the ink-receiving layer so that the colorant exhibits inferior color-developing ability. With a recording medium prepared by placing importance on the color-developing ability of a colorant, on the other hand, (an ink solvent runs over on the ink-receiving layer, thereby developing a problem such as image bleeding.

When an image is formed on a recording medium, the surface of which has been smoothened to impart gloss, by using a water-based dispersion ink with a pigment contained as a colorant therein, particles of the pigment cannot enter an ink-receiving layer so that the pigment particles remain on the surface. The image is, therefore, provided with lowered abrasion resistance. An attempt has, therefore, been made to provide the surface of an ink-receiving layer with some asperity. With this method, however, no satisfactory results have been obtained yet with respect to the ink absorbency upon forming an image or the surface gloss of the image so obtained.

As other methods for providing an ink-receiving layer with improved ink-fixing property, many methods have also been disclosed, each of which features incorporation of a cationic polymer having tertiary or quaternary ammonium salts in the ink-receiving layer. To improve the ink-fixing property of an ink-receiving layer, however, it is necessary to incorporate a predetermined or greater amount of such a cationic polymer in the ink-receiving layer. This leads to an increase in the amount of the cationic polymer in the ink-receiving layer. Accordingly, the content of fine inorganic particles in the ink-receiving layer is relatively decreased, thereby making it difficult to retain high ink-absorbing ability. In addition, the cationic polymer has a potential problem in that it may deteriorate the stability of a coating formulation required for the formation of the ink-receiving layer. This tendency becomes more pronounced as the content of the cationic polymer increases. The incorporation of such a cationic polymer, therefore, is accompanied by problems that the coating stability of the coating formulation is significantly reduced and the ink-receiving layer formed subsequent to the coating is provided with deteriorated surface smoothness and hence, with lowered gloss.

Further methods have, therefore, been proposed as new techniques. According to these methods, two solutions are used, one being an ink and the other an auxiliary solution for forming agglomerates when brought into contact with the ink, to improve the fixing property and waterproofness of a colorant on a recording medium. Before injecting the ink, the auxiliary solution is caused to adhere on the recording medium such that its ink-fixing property is improved.

For example, JP 63-29971 A discloses to cause a solution, which contains an organic compound having two or more cationic groups per molecule, to adhere on a recording medium and then to perform recording on the recording medium with an ink containing an anionic dye. JP 64-9279 A discloses to cause an acidic solution, which contains succinic acid or the like, to adhere on an ink-receiving layer and then to perform recording on the ink-receiving layer with an ink containing an anionic dye. JP64-63185 A discloses, specifically to cause a dye-insolubilizing solution to adhere before recording with an ink. Further, JP2002-302627 A discloses to cause a reaction mixture, which contains an anionic reactant and an anionic resin emulsion, to adhere on a recording medium and then to cause a water-based ink composition, which contains a colorant and a cationic resin emulsion, to adhere on the recording medium.

Even in the above-described methods, a recording medium the ink absorbency of which is low causes thickening of an ink only on the surface of the recording medium, thereby inducing an uneven distribution of the ink on the recording medium and a reduction in image uniformity. Further, the image-forming surface is hard to dry so that an image formed thereon is provided with lowered abrasion resistance. These methods are, therefore, accompanied by a drawback that, when images are formed, for example, on sheet-form recording media by continuous printing and the recorded matters are stacked one over the other, the recorded matters are smeared by offsetting or the like of the ink because the ink-absorbing property is insufficient. In addition, these methods are disadvantageous in cost because each printer requires an ejection system exclusively for the above-described auxiliary solution.

DISCLOSURE OF THE INVENTION

With the foregoing actual situation in view, the present invention has as an object the provision of an image recording method improved in ink absorbency and ink-fixing ability which have remained as drawbacks upon forming images with a water-based dispersion ink containing a water-insoluble colorant.

The present inventors have proceeded with an extensive investigation to develop an image recording method capable of forming images of high color density and good color tone, specifically an image recording method excellent in ink absorbency and ink-fixing property. As a result, it has been found that, when an inkjet recording ink containing a high-molecular dispersant formed of a block copolymer comprising at least one hydrophobic block and at least one hydrophilic block (hereinafter simply called "ink") adheres on an ink-receiving layer the surface pH of which has been controlled to a range of from 3.0 to 6.5, the high-molecular dispersant promptly agglomerates and deposits to achieve improvements in ink absorbency and ink-fixing property, leading to the completion of the present invention.

Described specifically, the present invention provides an image recording method for causing an ink to adhere on a recording medium, which is provided with at least one ink-receiving layer on a base material, to form an image, characterized in that the ink is an inkjet recording ink composed of a high-molecular dispersant formed of a block copolymer comprising at least one hydrophobic block and at least one hydrophilic block, a water-insoluble colorant, a water-soluble organic solvent and water, the ink-receiving layer comprises fine inorganic particles and a water-soluble resin and/or water-dispersible resin, and a surface pH of the ink-receiving layer is controlled within a range of from 3.0 to 6.5.

In the present invention as described above, it is preferred that the ink-receiving layer further comprises cationic fine organic particles and a cationic polymer; that a content of the cationic fine organic particles in the ink-receiving layer is from 0.1 to 25 wt. % based on a dry weight of the ink-receiving layer; that a weight average molecular weight of the cationic fine organic particles is from 100,000 to 1,000,000; that the cationic fine organic particles have a glass transition temperature of from 60 to 110° C.; that a weight average molecular weight of the cationic polymer is from 5,000 to 200,000; and that the cationic polymer is used in a proportion of from 0.05 to 5 wt. % based on the fine inorganic particles.

In the present invention as described above, it is also preferred that the fine inorganic particles are made of at least one of silica, alumina and aluminium hydrate of the boehmite structure or pseudo-boehmite structure each of which has an average particle size of from 100 to 300 nm; that the ink-receiving layer further comprises a water-soluble multivalent metal salt; that the water-soluble multivalent metal salt is used in a proportion of from 0.1 to 10 wt. % based on the fine inorganic particles; that the water-insoluble colorant is at least water-insoluble one colorant selected from the group consisting of pigments, oil-soluble dyes, vat dyes and disperse dyes; that the water-insoluble colorant is an oil-soluble dye; and that the high-molecular dispersant is a block copolymer obtained by polymerizing vinyl ethers as monomers, and has pH stimulation responsibility such that high molecular chains of the block copolymer can undergo association when a pH of the ink is lowered.

BEST MODES FOR CARRYING OUT THE INVENTION

The present invention will next be described in further detail based on preferred embodiments.

The ink for use in the present invention is primarily composed of a high-molecular dispersant formed of a block copolymer comprising at least one hydrophobic block and at least one hydrophilic block, a water-insoluble colorant, a water-soluble organic solvent and water, and the high-molecular dispersant may preferably have pH stimulation responsibility such that high molecular chains of the block copolymer undergoes association when a pH of the ink is lowered.

According to the present invention, the use of a block copolymer, which contains at least one hydrophobic block and at least one hydrophilic block, as a high-molecular dispersant makes it possible to achieve even deposition of hydrophobic units of the high-molecular dispersant on the surfaces of colorant particles, so that the high-molecular dispersant can evenly cover the colorant particles without exposure to the air, in other words, can encapsulate the colorant particles. As a consequence, the colorant is protected by the capsules of the high-molecular dispersant even in a printed image after recording. Compared with such a case that parts of colorant particles are exposed to the air from the beginning or such a case that parts of colorant particles are exposed to the air when the ink is ejected, the colorant is hence considered to be provided with improved fastness.

Further, the hydrophilic unit(s) of the high-molecular dispersant are contained in the form of block(s), resulting in good compatibility between the high-molecular dispersant and the ink medium. Compared with one making use of a random-polymerized high-molecular dispersant with hydrophobic group(s) contained in hydrophilic unit(s), the dispersed colorant particles are considered to be provided with substantially improved dispersion stability. Owing to these improvements, the colorant particles dispersed in the ink are considered to be much less susceptible to agglomeration or settling so that the ink exhibits better stability not only upon ejection but also during storage.

A detailed description will hereinafter be made about the ink constituents in the present invention.

(High-molecular Dispersant)

In the present invention, the high-molecular dispersant for use in the ink is required to be a block copolymer comprising at least one hydrophilic block and at least one hydrophobic block. Those containing one or more hydrophilic blocks and two or more hydrophilic blocks or those containing two or more hydrophobic blocks and one or more hydrophilic blocks can also be used. These two or more hydrophilic blocks and/or these two or more hydrophobic blocks may be of the same type or of different types. As the block copolymer, a single block copolymer or a blend of two or more block copolymers can be used. The structure of each copolymer can be linear, graft or the like, although a linear block copolymer is preferred.

As the high-molecular dispersant, one obtained by polymerizing vinyl ethers as monomers and containing a polyvinyl ether structure is preferred because it forms a stable dispersion with colorant particles. Particularly preferred is a high-molecular dispersant at least one hydrophilic block of which is either an anionic polyvinyl ether block or a diblock copolymer composed of a nonionic polyvinyl ether block and an anionic polyvinyl ether block, because the colorant particles dispersed in the ink medium are provided with further improved stability. When the at least one hydrophilic block of the high-molecular dispersant is a diblock copolymer composed of a nonionic polyvinyl ether block and an anionic polyvinyl ether block, a block copolymer composed of a polyvinyl ether block having hydrophobicity, the nonionic polyvinyl ether block having hydrophilicity and the anionic polyvinyl ether block having hydrophilicity in this order is more desired because the colorant particles dispersed in the ink medium are provided with still further improved stability.

As the polyvinyl ether block having hydrophobicity and forming the above-described high-molecular dispersant, a block having a recurring unit structure represented by the following formula (1) is preferred:

$$—(CH_2—CH(OR^1))— \quad (1)$$

In the above-described formula (1), $R^1$ represents an aliphatic hydrocarbon group such as an alkyl, alkenyl, cycloalkyl or cycloalkenyl group; or an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group. One or more of the hydrogen atoms on the aromatic ring may be substituted by hydrocarbon groups. The carbon number of $R^1$ may preferably range from 1 to 18.

$R^1$ can also be a group represented by —(CH($R^2$)—CH($R^3$)—O)$_p$—$R^4$ or —(CH$_2$)$_m$—(O)$_n$—$R^4$. In this case, $R^2$ and $R^3$ each independently represents a hydrogen atom or a methyl group, and $R^4$ represents an aliphatic hydrocarbon group such as an alkyl, alkenyl, cycloalkyl or cycloalkenyl group, an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group, with one or more hydrogen atoms on the aromatic ring being optionally substituted by hydrocarbon groups, —CO—CH=CH$_2$, —CO—C(CH$_3$)=CH$_2$, —CH$_2$—CH=CH$_2$, —CH$_2$—C(CH$_3$)=CH$_2$. In each of these groups, one or more hydrogen atoms may be substituted by halogen atoms such as fluorine, chlorine or bromine atoms to chemically feasible extent. The carbon number of $R^4$ may preferably range from 1 to 18. Preferably, p can range from 1 to 18, m can range from 1 to 36, and n can be 0 or 1.

In $R^1$ and $R^2$, examples of the alkyl and alkenyl groups can include methyl, ethyl, propyl, isopropyl, n-butyl, sec-butyl, t-butyl, pentyl, hexyl, heptyl, octyl, nonyl, decyl, dodecyl, tetradecyl, hexadecyl, octadecyl, and oleyl, and examples of the cycloalkyl and cycloalkenyl groups can include cyclopropyl, cyclobutyl, cyclopentyl, cyclohexyl and cyclooctyl.

As the polyvinyl ether block having hydrophilicity, on the other hand, a block having a recurring unit structure represented by the following formula (2) is preferred:

$$—(CH_2—CH(OR^5))— \quad (2)$$

In the above-described formula (2), $R^5$ is a group represented by —(CH$_2$—CH$_2$—O)$_k$—$R^6$, —(CH$_2$)$_m$—(O)$_n$—$R^6$, —$R^7$—X, —(CH$_2$—CH$_2$—O)$_k$—$R^7$—X or —(CH$_2$)$_m$—(O)$_n$—X. In this case, $R^6$ represents a hydrogen atom, a linear or branched $C_{1-4}$ alkyl group, —CO—CH=CH$_2$, —CO—C(CH$_3$)=CH$_2$, —CH$_2$—CH=CH$_2$, —CH$_2$—C(CH$_3$)=CH$_2$, and $R^7$ represents an aliphatic hydrocarbon group such as an alkylene, alkenylene, cycloalkylene or cycloalkenylene group, or an aromatic hydrocarbon group one or more of carbon atoms of which may be substituted by nitrogen atoms, such as a phenylene, pyridylene, benzylene, toluylene, xylylene, alkylphenylene, phenylenealkylene, biphenylene or phenylpyridylene group, with one or more hydrogen atoms on the aromatic ring being optionally substituted by hydrocarbon groups. In each of these groups, one or more hydrogen atoms may be substituted by halogen atoms such as fluorine, chlorine or bromine atoms to chemically feasible extent. X represents a group having anionic property, such as a carboxylate, sulfonate or phosphate group. The carbon number of $R^7$ may preferably range from 1 to 18. Preferably, k can range from 1 to 18, m can range from 1 to 36, and n can be 0 or 1.

Structures of the above-described monomers (I-a to I-o) and block copolymers (II-a to II-e) composed of the monomers will be exemplified below, although the structures of block copolymers usable in the present invention are not limited to them.

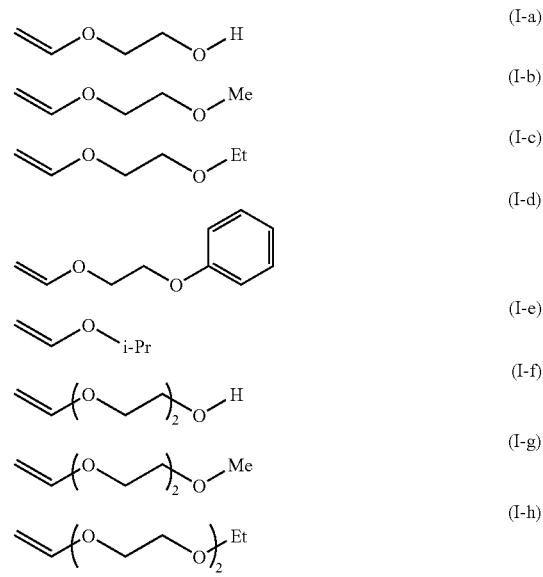

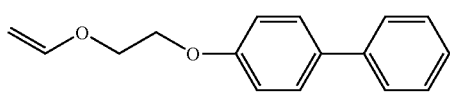 (I-i)

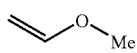 (I-j)

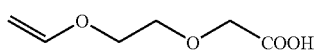 (I-k)

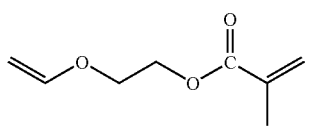 (I-l)

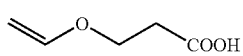 (I-m)

 (I-n)

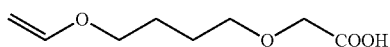 (I-o)

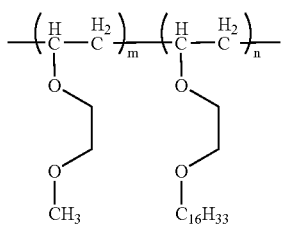 (II-a)

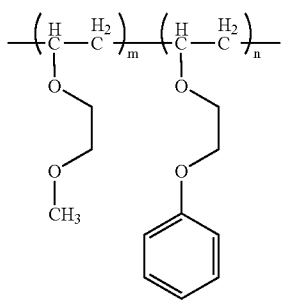 (II-b)

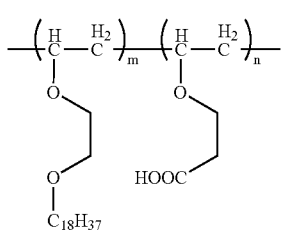 (II-c)

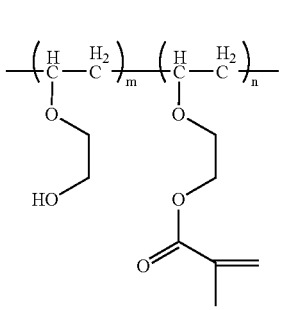 (II-d)

(II-e)

The preferred numbers of the respective recurring units in the block copolymers (i.e., m, n and l in the above-exemplified recurring units (II-a) to (II-e)) may each independently range from 1 to 10,000. More preferably, their total (i.e., m+n+l in the above-exemplified recurring units (II-a) to (II-e)) may range from 10 to 20,000. The number average molecular weight may range preferably from 500 to 20,000,000, more preferably from 1,000 to 5,000,000, most preferably from 2,000 to 2,000,000.

The proportion of the high-molecular dispersant in the ink may range preferably from 0.1 to 20 wt. %, more preferably from 0.5 to 10 wt. % based on the whole weight of the ink. The average particle size of the dispersed particles of the water-insoluble colorant dispersed by the high-molecular dispersant may desirably be 80 nm or smaller.

In the present invention, the pH stimulation responsibility of the high-molecular dispersant employed in the ink has property of lowering the pH of the ink such that high-molecular chains of the high-molecular dispersant are caused to associate to increase the viscosity of the ink. A printed image is provided with good fixing property especially when the pH stimulation responsibility can increase the ink viscosity preferably 50 times or more, more preferably 100 times or more after a response to pH stimulation compared with the ink viscosity before the response to pH stimulation.

(Water-insoluble Colorant)

Any colorant can be employed in the ink for use in the present invention insofar as it is substantially insoluble in water. Specifically, the colorant has a water solubility preferably of 0.5 wt. % or lower, more preferably of 0.1 wt. % or lower. As such colorants, oil-soluble dyes, vat dyes, disperse dyes, pigments and the like can be mentioned. Among these, oil-soluble dyes are more preferred because they can form stable colorant dispersions with the above-described high-molecular dispersant.

Examples of the water-insoluble colorant will be shown below although the present invention is not limited to them.

(Oil-soluble Dyes)

C.I. Solvent Yellow 1, C.I. Solvent Yellow 2, C.I. Solvent Yellow 3, C.I. Solvent Yellow 13, C.I. Solvent Yellow 14, C.I. Solvent Yellow 19, C.I. Solvent Yellow 22, C.I. Solvent Yellow 29, C.I. Solvent Yellow 36, C.I. Solvent Yellow 37, C.I. Solvent Yellow 38, C.I. Solvent Yellow 39, C.I. Solvent Yellow 40, C.I. Solvent Yellow 43, C.I. Solvent Yellow 44, C.I. Solvent Yellow 45, C.I. Solvent Yellow 47, C.I. Solvent Yellow 62, C.I. Solvent Yellow 63, C.I. Solvent Yellow 71, C.I. Solvent Yellow 76, C.I. Solvent Yellow 81, C.I. Solvent Yellow 85, C.I. Solvent Yellow 86; C.I. Solvent Red 27, C.I. Solvent Red 35, C.I. Solvent Red 36, C.I. Solvent Red 37, C.I. Solvent Red 38, C.I. Solvent Red 39, C.I. Solvent Red 40, C.I. Solvent Red 58, C.I. Solvent Red 60, C.I. Solvent Red 65, C.I. Solvent Red 69, C.I. Solvent Red 81, C.I. Solvent Red 86, C.I. Solvent Red 89, C.I. Solvent Red 91, C.I. Solvent Red 92, C.I. Solvent Red 97, C.I. Solvent Red 99, C.I. Solvent Red 100, C.I. Solvent Red 109, C.I. Solvent Red 118, C.I. Solvent Red 119, C.I. Solvent Red 122; C.I. Solvent Blue 14, C.I. Solvent Blue 24, C.I. Solvent Blue 25, C.I. Solvent Blue 26, C.I. Solvent Blue 34, C.I. Solvent Blue 37, C.I. Solvent Blue 39, C.I. Solvent Blue 42, C.I. Solvent Blue 43, C.I. Solvent Blue 45, C.I. Solvent Blue 48, C.I. Solvent Blue 52, C.I. Solvent Blue 53, C.I. Solvent Blue 55, C.I. Solvent Blue 59; C.I. Solvent Black 5, C.I. Solvent Black 7, C.I. Solvent Black 8, C.I. Solvent Black 14, C.I. Solvent Black 17, C.I. Solvent Black 19, C.I. Solvent Black 20, C.I. Solvent Black 22, C.I. Solvent Black 24, C.I. Solvent Black 26, C.I. Solvent Black 28, C.I. Solvent Black 43; etc.

(Vat Dyes)

C.I. Vat Yellow 2, C.I. Vat Yellow 4, C.I. Vat Yellow 10, C.I. Vat Yellow 20, C.I. Vat Yellow 33; C.I. Vat Orange 1, C.I. Vat Orange 2, C.I. Vat Orange 3, C.I. Vat Orange 5, C.I. Vat Orange 7, C.I. Vat Orange 9, C.I. Vat Orange 13, C.I. Vat Orange 15; C.I. Vat Red 1, C.I. Vat Red 2, C.I. Vat Red 10, C.I. Vat Red 13, C.I. Vat Red 15, C.I. Vat Red 16, C.I. Vat Red 61; C.I. Vat Blue 1, C.I. Vat Blue 3, C.I. Vat Blue 4, C.I. Vat Blue 5, C.I. Vat Blue 6, C.I. Vat Blue 8, C.I. Vat Blue 12, C.I. Vat Blue 14, C.I. Vat Blue 18, C.I. Vat Blue 19, C.I. Vat Blue 20, C.I. Vat Blue 29, C.I. Vat Blue 35, C.I. Vat Blue 41; C.I. Vat Black 1, C.I. Vat Black 8, C.I. Vat Black 9, C.I. Vat Black 13, C.I. Vat Black 14, C.I. Vat Black 20, C.I. Vat Black 25, C.I. Vat Black 27, C.I. Vat Black 29, C.I. Vat Black 36, C.I. Vat Black 56, C.I. Vat Black 57, C.I. Vat Black 59, C.I. Vat Black 60; etc.

(Disperse Dyes)

C.I. Disperse Yellow 5, C.I. Disperse Yellow 42, C.I. Disperse Yellow 83, C.I. Disperse Yellow 93, C.I. Disperse Yellow 99, C.I. Disperse Yellow 198, C.I. Disperse Yellow 224; C.I. Disperse Orange 29, C.I. Disperse Orange 49, C.I. Disperse Orange 73; C.I. Disperse Red 92, C.I. Disperse Red 126, C.I. Disperse Red 145, C.I. Disperse Red 152, C.I. Disperse Red 159, C.I. Disperse Red 177, C.I. Disperse Red 181, C.I. Disperse Red 206, C.I. Disperse Red 283; C.I. Disperse Blue 60, C.I. Disperse Blue 87, C.I. Disperse Blue 128, C.I. Disperse Blue 154, C.I. Disperse Blue 201, C.I. Disperse Blue 214, C.I. Disperse Blue 224, C.I. Disperse Blue 257, C.I. Disperse Blue 287, C.I. Disperse Blue 368; etc.

(Pigments)

"Raven 760 Ultra", "Raven 1060 Ultra", "Raven 1080", "Raven 1100 Ultra", "Raven 1170", "Raven 1200", "Raven 1250", "Raven 1255", "Raven 1500", "Raven 2000", "Raven 2500Ultra", "Raven 3500", "Raven 5250", "Raven 5750", "Raven 7000" "Raven 5000 ULTRA-II", "Raven 1190 ULTRA-II"(trade names, products of Columbian Carbon Co.); "Black Pearls-L", "MOGUL-L", "RegaL-330R", "RegaL-400R", "RegaL-660R", "Monarch-800", "Monarch-880", "Monarch-900", "Monarch-1000", "Monarch-1300", "Monarch-1400" (trade names, products of Cabot Corporation);

"Color Black-FW1", "Color Black-FW2", "Color Black-FW200", "Color Black-18", "Color Black-Si60", "Color Black-S170", "Special Black-4", "Special Black-4A", "Special Black-6", "Special Black-550", "Printex-35", "Printex-45", "Printex-55", "Printex-85", "Printex-95", "Printex-U", "Printex-140U", "Printex-V", "Printex-140V" (trade names, products of Degussa AG);

"No. 25", "No. 33", "No. 40", "No. 45", "No. 47", "No. 52", "No. 900", "No. 970", "No. 2200B", "No. 2300", "No. 2400B", "MCF-88", "MA600", "MA77", "MA8", "MA100", "MA230", "MA220" (trade names; products of Mitsubishi Chemical Corporation);

C.I. Pigment Yellow 12, C.I. Pigment Yellow 13, C.I. Pigment Yellow 14, C.I. Pigment Yellow 17, C.I. Pigment Yellow 20, C.I. Pigment Yellow 24, C.I. Pigment Yellow 74, C.I. Pigment Yellow 83, C.I. Pigment Yellow 86, C.I. Pigment Yellow 93, C.I. Pigment Yellow 97, C.I. Pigment Yellow 109, C.I. Pigment Yellow 110, C.I. Pigment Yellow 117, C.I. Pigment Yellow 120, C.I. Pigment Yellow 125, C.I. Pigment Yellow 128, C.I. Pigment Yellow 137, C.I. Pigment Yellow 138, C.I. Pigment Yellow 147, C.I. Pigment Yellow 148, C.I. Pigment Yellow 150, C.I. Pigment Yellow 151, C.I. Pigment Yellow 153, C.I. Pigment Yellow 154, C.I. Pigment Yellow 166, C.I. Pigment. Yellow 168, C.I. Pigment Yellow 180, C.I. Pigment Yellow 185; C.I. Pigment Orange 16, C.I. Pigment Orange 36, C.I. Pigment Orange 43, C.I. Pigment Orange 51, C.I. Pigment Orange 55, C.I. Pigment Orange 59, C.I. Pigment Orange 61, C.I. Pigment Orange 71; C.I. Pigment Red 9, C.I. Pigment Red 48, C.I. Pigment Red 49, C.I. Pigment Red 52, C.I. Pigment Red 53, C.I. Pigment Red 57, C.I. Pigment Red 97, C.I. Pigment Red 122, C.I. Pigment Red 123, C.I. Pigment Red 149, C.I. Pigment Red 168, C.I. Pigment Red 175, C.I. Pigment Red 176, C.I. Pigment Red 177, C.I. Pigment Red 180, C.I. Pigment Red 192, C.I. Pigment Red 215, C.I. Pigment Red 216, C.I. Pigment Red 217, C.I. Pigment Red 220, C.I. Pigment Red 223, C.I. Pigment Red 224, C.I. Pigment Red 226, C.I. Pigment Red 227, C.I. Pigment Red 228, C.I. Pigment Red 238, C.I. Pigment Red 240, C.I. Pigment Red 254, C.I. Pigment Red 255, C.I. Pigment Red 272; C.I. Pigment Violet 19, C.I. Pigment Violet 23, C.I. Pigment Violet 29, C.I. Pigment Violet 30, C.I. Pigment Violet 37, C.I. Pigment Violet 40, C.I. Pigment Violet 50; C.I. Pigment Blue 15, C.I. Pigment Blue 15:1, C.I. Pigment Blue 15:3, C.I. Pigment Blue 15:4, C.I. Pigment Blue 15:6, C.I. Pigment Blue 22, C.I. Pigment Blue 60, C.I. Pigment Blue 64; C.I. Pigment Green 7, C.I. Pigment Green 36; C.I. Pigment Brown 23, C.I. Pigment Brown 25, C.I. Pigment Brown 26; etc.

The content of the water-insoluble colorant in the ink for use in the present invention may range preferably from 0.1 to 20 wt. %, more preferably from 1.0 to 10 wt. % based on the whole weight of the ink. With an ink in which the content of a water-insoluble colorant is lower than 0.1 wt. %, it may be difficult to obtain a sufficient color density in some instances. With an ink in which the content of a water-insoluble colorant is higher than 20 wt. %, on the other hand, a reduction tends to occur in the ejection stability due to ink clogging or the like of the nozzle. The content ratio (A:B) of the water-insoluble colorant (A) to the above-described high-molecular dispersant (B) in the ink may desirably range from 100:1 to 1:2 in terms of solid weight ratio. These water-insoluble colorants may be used not only singly but also in combination.

(Water-soluble Organic Solvent)

As the water-soluble organic solvent in the ink for use in the present invention, any organic solvent can be used insofar as it is soluble in water. Two or more water-soluble organic solvents can be used in combination as a mixed solvent. When employed as such a mixed solvent, a solid, water-soluble organic compound may be contained insofar as the mixed solvent is liquid.

Among such water-soluble organic solvents, those having solubility parameters in a range of from 0.0 to +10.0 $(J/cm^3)^{1/2}$ relative to the solubility parameter of hydrophilic block units in the high-molecular dispersant are preferred because they render inkjet heads less susceptible to nozzle blocking. This solubility parameter $(\delta(J/cm^3)^{1/2})$ is expressed as the square root of the cohesive energy density of each solvent, and is a value which is calculated in accordance with the formula, $\delta=(\Delta E/V)^{1/2}$ wherein $\Delta E$ represents the molar heat of evaporation of the solvent and V represents the molar volume of the solvent, and which is a value inherent to the solvent and indicative of the solubility of the solvent. For example, $\delta=47.0$ in the case of water, $\delta=25.7$ in the case of ethanol, and $\delta=14.9$ in the case of hexane.

On the other hand, the solubility parameter ($\delta$) of the high-molecular dispersant is a value empirically calculated under the assumption that the solubility parameter of a solvent capable of providing the high-molecular dispersant with the infinite solubility or the maximum degree of swelling is equal to the solubility parameter of the high-molecular dispersant. As the solubility parameters of the high-molecular dispersant and water-soluble organic solvent in the present invention, values calculated from the molecular cohesion energies of the functional groups in the high-molecular dispersant and water-soluble organic solvent are used. As a method for calculating the solubility parameters ($\delta$) of the high-molecular dispersant and water-soluble organic solvent from the molecular cohesion energies of their functional groups, calculations can each be made in accordance with the following formula: $\delta=(\Delta E/V)^{1/2}=(\Sigma \Delta e_i/\Sigma \Delta v_i)^{1/2}$ wherein $\Delta E$ represents the molar heat of evaporation, V represents the molar volume, $\Delta e_i$ represents the energy of evaporation of the atomic group (J/mol), and $\Delta v_I$ represents the molar volume of the atomic group (cm$^3$/mol). Incidentally, the energy of evaporation of each atomic group and the molar volume of each atomic group were calculated using the Foders constants.

Examples of such water-soluble organic solvents can include lower alcohols such as methyl alcohol, ethyl alcohol, n-propyl alcohol, isopropyl alcohol, n-butyl alcohol, sec-butyl alcohol and tert-butyl alcohol; diols such as ethylene glycol, diethylene glycol, triethylene glycol, tetraethylene glycol, propylene glycol, dipropylene glycol, tripropylene glycol, 1,2-butanediol, 1,3-butanediol, 1,4-butanediol, thiodiglycol and 1,4-cyclohexanediol; triols such as glycerin, 1,2,4-butanetriol, 1,2,6-hexanetriol and 1,2,5-pentanetriol; hindered alcohols such as trimethylolpropane, trimethylolethane, neopentylglycol and pentaerythritol; glycol ethers such as ethylene glycol monomethyl ether, ethylene glycol monoethyl ether, ethylene glycol monoisoproyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether and dipropylene glycol monomethyl ether; dimethylsulfoxide, glycerin monoallyl ether, polyethylene glycol, N-methyl-2-pyrrolidone, 2-pyrrolidone, γ-butyrolactone, 1,3-dimethyl-2-imidazolidinone, sulfolane, β-dihydroxyethylurea, urea, acetonylacetone, dimethylformamide, dimethylacetamide, acetone, diacetone alcohol, tetrahydrofuran, and dioxane.

Among these, water-soluble organic solvents the boiling points of which are 120° C. or higher are preferred because their use can inhibit ink concentration at nozzle tips. The proportion of such a water-insoluble organic solvent in the ink may range preferably from 5 to 50 wt. %, more preferably from 10 to 30 wt. % based on the whole weight of the ink.

The foregoing are the constituents of the water-based ink for use in the present invention. In addition to these constituents, a variety of additives can be incorporated including surfactants, pH adjusters, antioxidants and antimolds.

(Recording Medium)

On the other hand, the recording medium for use in the present invention is basically composed of a base material and at least one ink-receiving layer arranged on the base material, the ink-receiving layer contains fine inorganic particles and a water-soluble resin and/or a water-dispersible resin, and the surface pH of the ink-receiving layer is controlled to the range of from 3.0 to 6.5.

(Base Material)

Examples of the base material in the recording medium for use in the present invention can include those formed of paper or the like, such as adequately sized paper, non-sized paper, coated paper, cast-coated paper, and resin-coated paper coated on both sides thereof with a resin such as a polyolefin (hereinafter called "resin-coated paper"); films made of transparent thermoplastic resins such as polyethylene, polypropylene, polyester, polylactic acid, polystyrene, polyacetate, polyvinyl chloride, cellulose acetate, polyethylene terephthalate and polymethyl methacrylate; sheet-like materials (synthetic paper and the like) formed of films opacified by inorganic fillers or fine bubbles; and sheets made of glass or metals.

In the present invention, the ink-receiving layer is formed on the base material. From the viewpoint of providing the ink-receiving layer with an enhanced surface gloss, it is preferred to use a resin-coated paper of film having non-water absorbing property and high smoothness. In particular, a resin-coated paper or film having a 60-deg. specular gloss of 5% or higher as measured in accordance with JIS Z 8741 at a surface on which the ink-receiving layer is formed is usable without any problem. To improve the adhesion strength between these base materials and the ink-receiving layers, corona discharge treatment or various undercoating treatments can be applied to surfaces of these base materials.

(Fine Inorganic Particles)

As fine inorganic particles contained in the ink-receiving layer of the recording medium in the present invention, fine inorganic particles having high ink-absorbing ability and excellent color-developing and permitting formation of images of high quality are preferred. Illustrative of such fine inorganic particles are calcium carbonate, magnesium carbonate, kaolin, clay, talc, hydrotalcite, aluminum silicate, calcium silicate, magnesium silicate, diatomaceous earth, alumina, colloidal alumina, aluminum hydroxide, aluminium hydrates of the boehmite structure, aluminium hydrates of the pseudo-boehmite structure, synthetic amorphous silica, colloidal silica, lithopone, and zeolite. These materials can be used either singly or in combination. Among these, silica, alumina and aluminium hydrates of the boehmite or pseudo-boehmite structure, all of which have the below-described average particle size, can be used more preferably.

As the form of the above-described fine inorganic particles, their average particle size may be preferably in a range of from 100 nm to 300 nm, more preferably in a range of from 150 nm to 250 nm for imparting adequate gloss and transparency to the ink-receiving layer. Inorganic fine particles the average particle size of which is smaller than 100 nm lead to an ink-receiving layer with reduced ink absorbency that, when printed by a printer of high ink ejection rate or by a printer of high-speed output, ink bleeding and beading may occur on the resulting image. An average particle size greater than 300 nm, on the other hand, may result in an ink-receiving layer with lowered transparency and reduced gloss. When the ink-receiving layer is formed of a multiplicity of layers in the present invention, the fine inorganic particles employed in the respective layers may be the same or different in kind and/or shape.

The average particle size of the fine inorganic particles can be measured by the dynamic light scattering method, and can be determined as a hydrodynamic average particle size from an analysis making use of the cumlant method described in "Polymer Structures (2), Scattering Experiments and Form Observations, Chapter 1: Light Scattering" (KYORITSU SHUPPAN CO., LTD.; Compiled by The Society of Polymer Science, Japan) or "J. Chem. Phys., 70 (B), 15 Apl., 3965 (1979)". In practice, it can be readily measured, for example, using "Laser Diffraction Particle Size Analyzer PARIII" (trade name; manufactured by OTSUKA ELECTRONICS CO., LTD.). A description will hereinafter be made about "the fine inorganic particles" by primarily taking an aluminium hydrate as a representative example.

An aluminium hydrate usable in the ink-receiving layer of the recording medium can be represented by the following formula (3):

$$Al_2O_{3-n}(OH)_{2n} \cdot mH_2O \quad (3)$$

wherein n stands for any one of integers 0, 1, 2 and 3, and m stands for a value of from 0 to 10, preferably from 0 to 5. Because $mH_2O$ represents a removable water phase which may not take part in the formation of a crystal lattice in many instances, m can stands for a value which is not an integer. It is to be noted that m may reach the value of 0 when an aluminium hydrate of this sort is subjected to calcination.

In general, an aluminium hydrate showing the boehmite structure is a layer compound the (020) crystal plane of which forms a huge plane, and shows a particular diffraction peak in its X-ray diffraction pattern. As the boehmite structure, it is possible to take, in addition to complete boehmite structure, a structure containing excess water between layers of (020) planes and called "pseudo-boehmite". An X-ray diffraction pattern of this pseudo-boehmite shows a broader diffraction peak than complete boehmite. As complete boehmite and pseudo-boehmite are not clearly distinguishable from each other, they will hereinafter be collectively called an aluminium hydrate showing the boehmite structure unless otherwise specifically indicated.

(Water-soluble Resin and/or Water-dispersible Resin)

Illustrative of the water-soluble resin and/or water-dispersible resin which is included in the ink-receiving layer are starch, gelatin and casein, and modified products thereof; cellulose derivatives such as methylcellulose, carboxymethylcellulose and hydroxyethylcellulose; completely or partially saponified polyvinyl alcohols and modified products thereof (including those modified with cations, anions, silanols or the like); urea resins; melamine resins; epoxy resins; epichlorohydrin resins; polyurethane resins; polyethylene-imine resins; polyamide resins; polyvinyl pyrrolidone resins; polyvinyl butyral resins; poly(meth)acrylic acid and copolymers thereof; acrylamide resins; maleic anhydride copolymers; polyester resins; SBR latex; NBR latex; methyl methacrylate-butadiene copolymer latex; acrylic polymer latexes such as acrylate ester copolymers; vinyl polymer latexes such as ethylene-vinyl acetate copolymer; and functional-group-modified polymer latexes formed by bonding cationic groups or anionic groups to a variety of these polymer latexes.

Preferred is polyvinyl alcohol obtained by hydrolyzing polyvinyl acetate and having an average polymerization degree of from 300 to 5,000. Its saponification degree may preferably be from 70 to lower than 100 molar %, with 80 to 99.5 molar % being particularly preferred. These water-soluble resins and/or water-dispersible resins can be used either singly or in combination.

As the amount of the water-soluble resin and/or water-dispersible resin (A) to be used, the mixing weight ratio (A:B) of the water-soluble resin and/or water-dispersible resin to the aluminium hydrate (B) may preferably be in a range of from 1:30 to 1:1, with an A:B range of from 1:20 to 1:3 being more preferred. Setting of the proportion of the water-soluble resin and/or water-dispersible resin within this range makes it possible to provide the resulting ink-receiving layer with resistance to crazing or separation as dust and also with good ink absorbency.

In the present invention, the surface pH of the ink-receiving layer in the recording medium is in the range of from 3.0 to 6.5. Preferably, the surface pH of the ink-receiving layer is in a range of from 3.0 to 6.0. An ink-receiving layer the surface pH of which is lower than 3.0 may result in corrosion of apparatuses to be employed for the formation of the ink-receiving layer, such as a coating machine and a dryer, and is not practical. An ink-receiving layer the surface pH of which is higher than 6.5 may not allow the high-molecular dispersant, which is contained in the ink, to exhibit its pH stimulation responsibility well in some instances. Therefore, surface pH outside the above-described range is not preferred.

In the present invention, a variety of acids are usable to control the surface of the ink-receiving layer to pH 3.0 to 6.5. Illustrative of such acids are organic acids such as formic acid, acetic acid, glycolic acid, oxalic acid, propionic acid, malonic acid, succinic acid, adipic acid, maleic acid, malic acid, tartaric acid, citric acid, benzoic acid, phthalic acid, isophthalic acid, terephthalic acid, glutaric acid, gluconic acid, lactic acid, aspartic acid, glutamic acid, pimelic acid and suberic acid; and inorganic acids such as hydrochloric acid, nitric acid and phosphoric acid. They can be used either singly or in combination.

Incidentally, the term "surface pH" as used herein means a value measured 30 seconds later by using deionized water of pH 6.7 in accordance with the procedure described in J. TAPPI Pulp and Paper Testing Method No. 49.

(Cationic Fine Organic Particles)

In the present invention, the ink-receiving layer preferably includes cationic fine organic particles. The inclusion of the cationic fine organic particles leads to an increase in the percentage of voids in the ink-receiving layer, thereby making it possible to enhance the ink absorbency and also to improve the ink-fixing property owing to bonding between the cationic fine organic particles and hydrophilic blocks of the high-molecular dispersant contained in the ink. As the cationic fine organic particles for use in the present invention, fine particles made of a high-molecular compound containing, for example, cationic groups such as amino groups and/or amidino groups are preferred. Such a high-molecular compound is composed of a monomer having one or more cationic functional groups and another monomer copolymerizable therewith.

Examples of the monomer containing one or more cationic functional groups can include amino-containing (meth)acrylate monomers represented by the below-described formula (4) and amino-containing (meth)acrylamide monomers represented by the below-described formula (5). The monomers represented by the formula (4) or the formula (5) can be N-alkyl-substituted derivatives and N,N-dialkyl-substituted derivatives, and can also be those converted into quaternary salts with halogenated hydrocarbons or the like. In general, use of an N,N-dialkyl-substituted derivative or a quaternary salt of an N,N-dialkyl-substituted derivative is preferred. They can be used either singly or in combination.

Formula (4)

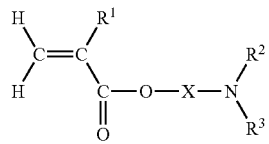

wherein $R^1$ represents a hydrogen atom or a methyl group, $R^2$ and $R^3$ may be the same or different and each independently represents a hydrogen atom or a $C_{1-4}$ alkyl group, and X represents a $C_{2-18}$ alkylene group.

Formula (5)

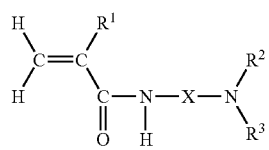

wherein $R^1$ represents a hydrogen atom or a methyl group, $R^2$ and $R^3$ may be the same or different and each independently represents a $C_{1-4}$ alkyl group, and X represents a $C_{2-18}$ alkylene group.

As a monomer copolymerizable with the above-mentioned monomers each of which contains one or more cationic functional groups, any unsaturated monomer can be used insofar as it is other than the compounds represented by the formula (4) or the formula (5). The cationic fine organic particles for use in the present invention can use at least an acrylate ester, methacrylate ester or styrene derivative as a monomer. More specific examples can include monomers represented by the below-described formula (6) or formula (7). In particular, cationic fine organic particles suitable for the present invention are those made of a cationic acrylic copolymer emulsion resin obtained from the above-described monomer containing one or more functional groups and an acrylate ester, a methacrylate ester and/or a styrene derivative.

Formula (6)

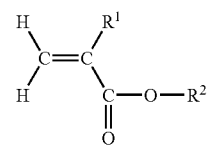

wherein $R^1$ represents a hydrogen atom or a methyl group, and $R^2$ represents a $C_{2-18}$ alkyl, cyclohexyl, phenyl, benzyl or glycidyl group or a group represented by —$R^3OR^4$ in which $R^3$ is a $C_{2-4}$ alkylene group and $R^4$ is a hydrogen atom or $C_{1-4}$ alkyl group.

Formula (7)

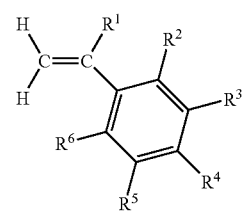

wherein $R^1$ represents a hydrogen atom or a $C_{1-4}$ alkyl group, and $R^2$ to $R^6$ each independently represents a hydrogen or chlorine atom or a $C_{1-4}$ alkyl, alkoxy or vinyl group.

As a method for imparting cationic property to the fine organic particles for use in the present invention, an amidino-containing initiator can also be used instead of the above-mentioned monomer of the formula (4) or (5). Examples of the amidino-containing initiator can include 2,2'-azobis(2-amidinopropane) dichloride, 2,2'-azobis[2-(N-phenylamidino)propane]dichloride, 2,2'-azobis{2-[N-(4-chlorophenyl)amidino]propane}dichloride, 2,2'-azobis{2-[N-(4-hydroxyphenyl)amidino]propane}dichloride, 2,2'-azobis[2-(N-benzylamidino)propane]dichloride, 2,2'-azobis[2-(N-allylamidino)propane]dichloride, and 2,2'-azobis{2-[N-(2-hydroxyethyl)amidino]propane}dichloride. One or more of these amidino-containing initiators can be chosen.

Illustrative of monomers polymerizable or copolymerizable by using such amidino-containing initiators are the above-mentioned monomers containing cationic functional groups and represented by the formula (4) or (5) and the above-mentioned copolymerizable monomers represented by the formula (6) or (7).

To the cationic fine organic particles for use in the present invention, a compound having ultraviolet absorbing property or light stabilizing function may be copolymerized as needed. Examples can include 2-(2'-hydroxy-5'-methacryloyloxyethylphenyl)-2H-benzotria zole, 2-(2'-hydroxy-5'-methacryloyloxyphenyl)-benzotriazole, 2-(2'-hydroxy-5'-methacryloyloxyphenyl)-5-chlorobenzotria zole, and 2-hydroxy-4-(2-methacryloyloxy)ethoxybenzophenone. One or more of these compounds can be chosen and used.

The weight average molecular weight of the cationic fine organic particles for use in the present invention may preferably be 60,000 or higher, more preferably 100,000 to 1,000,000. A weight average molecular weight lower than 60,000 tends to induce deformations of the cationic fine organic particles, possibly leading to a decrease in the percentage of voids between the fine particles and a reduction in ink absorbency in some instances.

The weight average particle size of the cationic fine organic particles for use in the present invention can be measured by the dynamic light scattering method, and can range preferably from 10 to 300 nm, more preferably from 10 to 150 nm, still more preferably from 10 to 100 nm. A weight average particle size smaller than 10 nm may lead to insufficient voids between the fine particles and insufficient ink absorbency, thereby developing a problem in that drying property and image quality may be lowered. A weight average particle size greater than 300 nm, on the other hand, leads to a reduction in the transparency of the layer with the cationic fine organic particles contained therein, thereby developing a problem in that the visibility of a colorant in or under the layer may be lowered to result in a reduced color density.

The cationic fine organic particles for use in the present invention can preferably have a glass transition temperature of 40° C. or higher, with 60 to 110° C. being more preferred. A glass transition temperature lower than 40° C. may cause the cationic fine organic particles to fuse together or to be formed into a film in a drying step subsequent to coating, possibly leading to a decrease in the percentage of voids between the fine particles and a reduction in ink absorbency in some instances. Incidentally, the above-mentioned glass transition temperature can be determined from a DSC curve measured by a differential scanning calorimeter (DSC) on the basis of JIS K 7121.

The cationic fine organic particles for use in the present invention can be produced by the conventionally-known emulsion polymerization process or mechanical emulsification method. According the emulsion polymerization process, for example, one or more monomers can be charged at once and then polymerized or polymerization is conducted while continuously feeding one or more monomers, both in the presence of a dispersant and an initiator, and a substantial dispersion of fine organic particles in water, which is generally called "an emulsion", can be obtained.

In the present invention, the proportion of the cationic fine organic particles in the recording medium can range preferably from 0.1 to 25 wt. %, more preferably from 1 to 25 wt. % based on the dry weight of the ink-receiving layer. As the percentage of the cationic fine organic particles based on the fine inorganic particles, a range of from 1 to 30 wt. % is preferred, with a range of from 5 to 30 wt. % being more preferred. Within these ranges, the cationic fine organic particles can effectively provide recorded images with improved ink absorbency and ink-fixing property without giving any adverse effect on the coating applicability.

(Cationic Polymer)

The ink-receiving layer in the present invention may preferably contain a cationic polymer together with the fine inorganic particles, the water-soluble resin and/or water-dispersible resin and the cationic fine organic particles. When dissolved or dispersed in water, the cationic polymer for use in the present invention dissociates and shows cationic property. Preferably, it is an oligomer or polymer of a primary, secondary or tertiary amine or a quaternary ammonium salt. Illustrative of such a cationic polymer are a dimethylamine-epichlorohydrin polycondensation product, an acrylamide-diallylamine copolymer, polyvinylamine copolymers, and polymers of dicyandiamide or dimethyl-diallylammonium chloride as a primary component.

No particular limitation is imposed on the arrangement of monomer units in the high-molecular chains of the polycondensation product or copolymer, and the polycondensation product or copolymer can be of any structure such as a random copolymer, alternating copolymer, block copolymer or multiblock copolymer. Taking into consideration the viscosity when formed into an aqueous solution or aqueous dispersion, the weight average molecular weight may range preferably from 5,000 to 20,000 although neither its molecular weight nor its molecular weight distribution is particularly limited.

In the present invention, the cationic polymer can be used preferably in a proportion of from 0.05 to 5 wt. % based on the fine inorganic particles. A proportion smaller than 0.05 wt. % is not effective for the ink-fixing property, while a proportion greater than 5 wt. % leads to a relative decrease in the content of the fine inorganic particles so that the percentage of voids is decreased to lower the ink absorbency. Such a large proportion also leads to a rise in the viscosity of a coating formulation to form the ink-receiving layer. Therefore, proportions outside the above-described range are not preferred.

(Water-soluble Multivalent Metal Salt)

In the present invention, the water-soluble multivalent metal salt which can be contained in the ink-receiving layer may preferably be the salt of a divalent or higher valent metal. In the case of a salt of a monovalent metal such as Na or K, the salt has a smaller effect on the high-molecular dispersant so that it needs to be used in a large amount to bring about the effect as much as the multivalent metal. Such a large amount is not preferred because it affects the characteristics of the coating formulation and those of the recording medium.

Examples of the metal in the water-soluble multivalent metal salt can include Mg, Zn, Al, Ca, Ba, Cu, Fe, Ni, Pb, and Co, and those capable of forming salts with anions such as Cl, $NO_3$, I, Br, $ClO_3$, $SO_4$ and COO are preferred. Among these, Ni, Pb and Co salts are high in toxicity. Therefore, Mg, Zn, Al, Ca, Ba, Cu, Fe salts are particularly preferred for their weak toxicity and relatively high handling ease. These multivalent metal salts can be used either singly or in combination. When two or more multivalent metal salts are used together, their metals may be different or they may be a combination of different salts of the same metal such as the sulfate and chloride of the same metal.

Concerning the amount of the water-soluble multivalent metal salt to be used, it is preferred to add it in a proportion of from 0.1 to 10 wt. % based on the fine inorganic particles, with a range of from 0.1 to 8 wt. % being more preferred. In the case of a recording medium containing the water-soluble metal salt at a content lower than 0.1 wt. %, its action on the high-molecular dispersant is weak to result in insufficient ink-fixing property so that, when continuous printing is performed and recorded matters are stacked one over the other, they may be smeared in some instances. In the case of a recording medium containing the water-soluble metal salt at a content higher than 10 wt. %, on the other hand, the coating applicability may be adversely affected. Therefore, contents of the water-soluble multivalent metal salt outside the above range are not preferred.

(Hardener)

In the present invention, use of a hardener is preferred to improve the film-forming properties, waterproofness and film strength of films formed of the above-described water-soluble resin and/or water-dispersible resin. In general, the hardener is chosen from various ones depending upon the type(s) of reactive group(s) contained in the resin(s) to be used. In the case of a polyvinyl alcohol resin, for example, an epoxy hardener or an inorganic hardener such as boric acid or a water-soluble aluminum salt can be mentioned. Examples of hardeners usable in the present invention can include boron compounds such as oxygen acids, each of which contains a boron atom as a center atom, and their salts. Specifically, orthoboric acid, metaboric acid, hypoboric acid, tetraboric acid and pentaboric acid, their salts and the like can be used preferably.

The amount of such a boron compound to be used varies depending upon the amount of the water-soluble resin and/or water-dispersible resin to be employed as a binder. In general, however, such a boron compound may be added in a proportion of from 0.1 to 30 wt. % based on the water-soluble resin and/or water-dispersible resin. A content of such a boron compound lower than 0.1 wt. % based on the water-soluble resin and/or water-dispersible resin may lead to a reduction in the film-forming property of the ink-receiving layer, thereby possibly failing to obtain sufficient waterproofness in some instances. A content of such a boron compound higher than 30 wt. % based on the water-soluble resin and/or water-dispersible resin, on the other hand, may lead to a coating formulation for forming an ink-receiving layer, the viscosity of which may substantially vary with time to result in inferior coating stability in some instances.

The recording medium for use in the present invention can be obtained by preparing a coating formulation, which contains the fine inorganic particles, the water-soluble resin and/or water-dispersible resin, and other optional components, for example, the cationic fine organic particles and the cationic polymer, applying the coating formulation on a surface of a base material or the coating formulation as at least one of multiple layers to be formed on the base material, and then drying the thus-applied coating formulation to form an ink-receiving layer. The above-mentioned acid, which serves to control the surface of the ink-receiving layer to pH 3.0 to 6.5, can be added in the coating formulation or can be over-coated on the ink-receiving layer.

No particular limitation is imposed on the aqueous medium in the coating formulation employed for forming the ink-receiving layer in the present invention, insofar as it is water or a mixture of water and a water-miscible organic solvent. Examples of the water-miscible organic solvent can include alcohols such as methanol, ethanol and propanol; lower alkyl ethers of polyhydric alcohols, such as ethylene glycol, monomethyl ether and ethylene glycol dimethyl ether; ketones such as acetone and methyl ethyl ketone; and ethers such as tetrahydrofuran.

Further, various additives can also be incorporated to extents not impairing the advantageous effects of the present invention. Examples of such additives can include surfactants, pigment dispersants, thickeners, defoamers, dot adjusting agents, coloring matters, fluorescent whitening agents, antioxidants, ultraviolet absorbers and preservatives.

As a method for applying the thus-prepared coating formulation onto the base material, a known, desired coating method can be used. For example, coating is feasible by coating methods such as blade coating, air knife coating, curtain coating, slot die coating, bar coating, gravure coating and roll coating. The thus-coated base material is then dried using a drier such as a hot air drier, hot drum or far-infrared drier to for man ink-receiving layer. The ink-receiving layer may be formed by changing the proportions of the fine inorganic particles, the water-soluble resin and/or water-dispersible resin and the other additives, and can be formed on one side or each side of the base material. Further, smoothening processing may be applied using a machine such as a calender roll, for example, in order to provide images with an improved resolution and the recording medium with improved feedability.

A preferred range of the coat weight of the coating formulation on the base material can be from 0.5 to 60 g/m$^2$ in terms of solids, with a range of from 5 to 55 g/m$^2$ being (more preferred. A coat weight smaller than 0.5 g/m$^2$ results in the formation of an ink-receiving layer, which may not be able to sufficiently absorb water from an ink so that the ink may run or images may bleed in some instances. A coat weight greater than 60 g/m$^2$, on the other hand, may develop curling upon drying or may not be able to bring about the advantageous effect to such pronounced extent as expected on the printing performance.

The above-described range of the coat weight is also applicable when the ink-receiving layer is formed of a multiplicity of layers. In this case, the coat weight of the layer, which contains the fine inorganic particles, the resin(s) and others (the cationic fine organic particles, the cationic organic polymer, etc.), may preferably be one twentieth or greater of the total coat weight including all the remaining layers. A coat weight smaller than this range may not be able to bring about any sufficient advantageous effect on the ink-fixing property.

As a reason for the exhibition of good ink-fixing property by such a recording medium useful in the present invention, it is presumable that, when the colorant dispersion ink containing the high-molecular dispersant formed of the block copolymer comprising at least one hydrophobic block and at least one hydrophilic block has adhered on the ink-receiving layer the surface pH of which was controlled to the range of from 3.0 to 6.5, molecules of the high-molecular dispersant promptly agglomerate, deposit and intricately tangle with one another to wrap colorant particles and hence, to show strong ink-fixing property. When cationic fine organic particles and a cationic polymer or a multivalent metal salt exist at the same time, these cationic substances are considered to form ionic bonds with the hydrophilic block(s) in the high-molecular dispersant (or carboxyl group(s) in the block(s)) and hence, to show strong ink-fixing property.

As a method for applying the above-described ink onto the above-described recording medium to perform recording of images, inkjet recording is particularly suited. Any inkjet recording method can be used insofar as it can effectively release the ink from a nozzle to apply it onto the recording medium. It is particularly effective to use an inkjet recording method that in the manner disclosed in JP 54-59936 A and the like, an ink is exposed to thermal energy to undergo an abrupt change in volume and is then ejected through a nozzle under acting force produced by this change in state.

EXAMPLES

The present invention will hereinafter be specifically described based on Examples, in which all designations of "part" or "parts" and "%" are on a weight basis unless otherwise specifically indicated.

<Preparation of a High-molecular Dispersant A>

Synthesis of an A-B diblock copolymer formed of one type of hydrophobic blocks and one type of hydrophilic blocks:

A glass vessel fitted with a three-way cock was purged with nitrogen gas, and then, heated at 250° C. under a nitrogen gas atmosphere to remove any adsorbed water. After the system was allowed to cool down to room temperature, 2-decanoxyethyl vinyl ether (12 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and the A blocks of an A-B diblock copolymer were synthesized.

Using a column chromatography (GPC), the molecular weight was monitored in a time division manner. Subsequent to the completion of the polymerization of the A blocks, a vinyl monomer (12 mmol) which had been obtained by esterifying the carboxyl group of 4-(2-vinyloxyethoxy)benzoic acid (the B block) with an ethyl group was added to conduct synthesis of B blocks. Termination of the polymerization reaction was effected by adding into the system a 0.3% solution of ammonia in methanol.

The esterified carboxyl group was hydrolyzed with a solution of sodium hydroxide in methanol to convert the ester form into the carboxylic acid form. After completion of the reaction, dichloromethane was added to the reaction mixture to dilute the same. The thus-diluted reaction mixture was washed thrice with 0.6 N hydrochloric acid solution and then, thrice with distilled water to conduct desalting treatment. The reaction mixture was neutralized with aqueous ammonia, and then, concentrated to dryness in an evaporator. The resulting solid matter was dried in vacuo to afford the A-B diblock copolymer (high-molecular dispersant A). Identification of the compound was conducted using NMR and GPC (Mn=3.5×10$^4$, Mn/Mw=1.2). The resultant high-molecular dispersant was tested for its pH stimulation responsibility. It was ascertained to exhibit stimulation responsibility when the pH is lowered to 6.5 or further.

<Preparation of a Colorant Dispersion I>

C.I. Solvent Yellow 14 (1.0 part), a commercially-available, oil-soluble dye, and acetone (99.0 parts) were mixed, heated to 40° C., and then thoroughly stirred into a homogeneous solution. The solution was added to a solution of the above-described high-molecular dispersant A (1.0 part) in tetrahydrofuran (99.0 parts), and after mixing, water (10.0 parts) was added. Subsequently, acetone and tetrahydrofuran were removed by a rotary evaporator to afford a colorant dispersion I. The concentrations of acetone and tetrahydrofuran in the resultant colorant dispersion were analyzed by gas chromatography. Neither solvents were detected, resulting in the conclusion that they did not remain in the colorant dispersion.

| <Preparation of an ink 1> | |
| --- | --- |
| Colorant dispersion I | 40.0 parts |
| Tripropylene glycol | 15.0 parts |
| Triethylene glycol | 5.0 parts |
| Deionized water | 40.0 parts |

The above components were mixed and thoroughly stirred to afford the target ink 1. The pH of the resultant ink was measured. It was found to be 8.0. Further, the average particle size of the color dispersion in the resultant ink was also measured by an instrument making use of the laser scattering method ("ELS-800", trade name; manufactured by OTSUKA ELECTRONICS CO., LTD.). It was found to be 47 nm.

<Preparation of a Colorant Dispersion II>

C.I. Solvent Yellow 14 (1.0 part), a commercially-available, oil-soluble dye, and acetone (99.0 parts) were mixed, heated to 40° C., and then thoroughly stirred into a homogeneous solution. The solution was added to a solution of a styrene-maleic acid random copolymer (number average molecular weight: 10,000) (1.0 part) as a high-molecular dispersant in tetrahydrofuran (99.0 parts), and after mixing, water (10.0 parts) was added. Subsequently, acetone and tetrahydrofuran were removed by a rotary evaporator to afford a colorant dispersion II. The high-molecular dispersant employed above was tested to ascertain whether or not it was equipped with any pH stimulation responsibility. No stimulation responsibility was observed.

| <Preparation of an ink 2> | |
| --- | --- |
| Colorant dispersion II | 50.0 parts |
| Diethylene glycol | 10.0 parts |
| Thiodiglycol | 10.0 parts |
| Deionized water | 30.0 parts |

The above components were mixed and thoroughly stirred to afford an ink 2.

<Preparation of a Dispersion of Aluminium Hydrate>

Following the process disclosed in U.S. Pat. No. 4,242,271, aluminum dodexide was prepared. Following the process disclosed in U.S. Pat. No. 4,202,870, the aluminum dodexide was then hydrolyzed to prepare an alumina slurry. Water was added to the alumina slurry until the solid content of an aluminium hydrate reached 7.7%. At that time, the pH of the alumina slurry was 9.3. A 3.9% nitric acid solution was added to the slurry to adjust its pH to 6.0.

Using an autoclave, the slurry was then subjected to aging (aging temperature: 150° C., aging time: 6.5 hours) to obtain a colloidal sol. The colloidal sol was spray-dried into an aluminium hydrate powder at an inlet temperature of 87° C. The powder so obtained was an aluminium hydrate, the particle shape and crystal structure of which were plate-like and the boehmite structure, respectively. Further, the aluminium hydrate powder having the boehmite structure was mixed at a concentration of 19% in deionized water to prepare an aluminium hydrate dispersion A.

The dispersion A obtained by the above-described procedure was redispersed by an ultrasonic homogenizer, "MUS-600CCVP-12" (trade name; manufactured by Nihon Seiki Seisakusho Co., Ltd.). Coarse particles were then removed by centrifugation, followed by the addition of deionized water to prepare an aluminium hydrate dispersion B the concentration of which was 17%.

Further, deionized water was added to the dispersion A to adjust the concentration to 17%. The resulting dispersion was provided as an aluminium hydrate dispersion C. The average particle sizes of the aluminium hydrates obtained as described above were measured using a laser diffraction particle size analyzer ("PARIII", trade name; manufactured by OTSUKA ELECTRONICS CO., LTD.). They were determined to be 167.8 nm in the dispersion B and 264.2 nm in the dispersion C.

Example 1

A coating formulation was prepared by combining a mixture of the aluminium hydrate dispersion B (100 parts, solid content: 17%) and a 3% aqueous solution of boric acid (17.0 parts; 3% based on the aluminium hydrate) with a solution of polyvinyl alcohol ("PVA-235", trade name; product of Kuraray Co., Ltd.; 1.7 parts) in water (15.3 parts). The coating formulation was next applied to a polyethylene-coated paper (60-deg. specular gloss of the surface to be coated as measured by JIS Z 8741: 64%) by die coating to give a dry coat weight of 35 g/m². In an oven (manufactured by Yamato Scientific Co., Ltd.), the thus-coated paper was then dried with hot air at 100° C. for 15 minutes to form an ink-receiving layer. Further, a 0.5 N aqueous solution of sulfuric acid was overcoated on the ink-receiving layer by the bar coating method such that the pH of the surface of the ink-receiving layer was adjusted to 3.5 to afford a recording medium (1).

Next, evaluation of the image recording method according to the present invention was conducted by the following methods:

<Ranking of Ink-fixing Property>

The ink 1 was loaded on an inkjet recording apparatus equipped with an on-demand, multi-recording head of the type that an ink is ejected by applying to the ink thermal energy corresponding to each recording signal ("BJF-660", trade name; manufactured by Canon Inc.). After solid printing was performed on the recording medium (1), the inkjet recording apparatus was left over for 2 hours. A sheet of "SILBON" paper (lens paper) was then placed on a printed area and a non-printed area of the recording medium (1), and further, a weight of 200 g/cm² was placed on the lens paper. The weight was then caused to slide 5 strokes over the printed area and non-printed area. The non-printed area and printed area were observed for a smear and rubbing, respectively. Ranking was performed in accordance with the following ranking standards. The results are presented in Table 1.

A: The non-printed area was free of any smear, and the printed area was also free of rubbing.

B: The non-printed area had a slight smear, and the printed area had been slightly rubbed.

C: The non-printed area had a smear, and the printed area had been rubbed off at some part(s) thereof.

Example 2

A recording medium (2) was prepared in a similar manner as in Example 1 except that the aluminium hydrate dispersion B was replaced by the aluminium hydrate dispersion C and the surface pH of the ink-receiving layer was adjusted to 4.7. Ink-fixing property was then ranked in a similar manner as in Example 1 except that the recording medium (1) was changed to the recording medium (2). The results are presented in Table 1.

Comparative Example 1

A recording medium (3) was prepared in a similar manner as in Example 1 except that the 0.5 N aqueous solution of sulfuric acid was changed to a 1% aqueous solution of sodium hydroxide and the 1% aqueous solution of sodium hydroxide was overcoated to adjust the surface pH of the ink-receiving layer to 7.5. Ink-fixing property was then ranked in a similar manner as in Example 1 except that the recording medium (1) was changed to the recording medium (3). The results are presented in Table 1.

Comparative Example 2

Ink-fixing property was ranked in a similar manner as in Example 1 except that the ink 1 was replaced by the ink 2. The results are presented in Table 1.

TABLE 1

| Ranking Results | |
|---|---|
| | Fixing property |
| Example 1 | A |
| Example 2 | A |
| Comp. Ex. 1 | C |
| Comp. Ex. 2 | C |

Example 3

To the aluminium hydrate dispersion B (100 parts; solid content: 17%), a 3% aqueous solution of boric acid (17.0 parts (3% based on the aluminium hydrate) "XCPP104" (trade name, product of Mitsui Chemicals, Inc.; 30% dispersion, particle size: 35 nm, glass transition temperature: 100° C.; 5.67 parts (10% based on the aluminium hydrate)) as cationic fine organic particles and "PAA-HCL-3L" (trade name for an allylamine polymer; 50% aqueous solution; product of Nitto Boseki Co., Ltd.; 0.68 parts (2% based on the aluminium hydrate)) as a cationic polymer were added. The resulting mixture was combined with a solution of polyvinyl alcohol ("PVA-235", trade name; product of Kuraray Co., Ltd.; 1.7 parts) in water (15.3 parts) to prepare a coating formulation. The coating formulation was next applied to a polyethylene-coated paper (60-deg. specular gloss of the surface to be coated as measured by JIS Z 8741: 64%) by die coating to give a dry coat weight of 35 g/m². The thus-coated paper was then dried with hot air to form an ink-receiving layer. Further, a 0.5 N aqueous solution of sulfuric acid was overcoated on the ink-receiving layer by the bar coating method such that the pH of the surface of the ink-receiving layer was adjusted to 3.5 to afford a recording medium (3). Next, effects of the image recording method according to the present invention were evaluated by the below-described methods. The results are presented in Table 2.

<Ranking of Ink Absorbency>

The ink 1 was loaded on an inkjet recording apparatus equipped with an on-demand, multi-recording head of the type that an ink is ejected by applying to the ink thermal energy corresponding to each recording signal ("BJF-660", tradename; manufactured by Canon Kabushiki Kaisha). Using yellow (Y), magenta (M), cyan (C) and black (Bk) inks, single-color solid printing, two-color solid printing and three-color solid printing were performed with ink quantities of 100%, 200% and 300%, respectively, on samples of the above-described recording medium (3). After the printing, each recorded area was touched with a finger, and the extent of adhesion of the ink(s) on the finger was observed to rank the ink absorbency in accordance with the following ranking standards.

A: No ink adhered on the finger with 300% ink quantity (three colors)

B: No ink adhered on the finger with 200% ink quantity (two colors)

C: No ink adhered on the finger with 100% ink quantity (single color)

D: Ink adhered on the finger with 100% ink quantity

<Ranking of Ink-fixing Property>

Ink-fixing property was ranked in a similar manner as in Examples 1–2. However, the recording medium (3) was used as a recording medium, and the left-overtime after the printing was changed to 30 minutes. The ranking was performed in accordance with the following ranking standards.

- A: The non-printed area was free of any smear, and the printed area was also free of rubbing.
- B: The non-printed area had a slight smear, and the printed area had been slightly rubbed.
- C: The non-printed area had a smear, and the printed area had been rubbed off at some part(s) thereof.
- D: The non-printed area had a severe smear, and the printed area had been rubbed off at every part thereof.

Example 4

A recording medium (4) was prepared in a similar manner as in Example 3 except that the cationic fine organic particles were changed to "XCPP105" (trade name, product of Mitsui Chemicals, Inc.; 30% dispersion, particle size: 66 nm, glass transition temperature: 100° C.) and "XCPP105" was added in an amount of 17.0 parts (30% based on the aluminium hydrate). Using the thus-obtained recording medium (4), its ink absorbency and ink-fixing property were ranked in a similar manner as in Example 3. The results are presented in Table 2.

Example 5

A recording medium (5) was prepared in a similar manner as in Example 3 except that the aluminium hydrate dispersion B was replaced by the aluminium hydrate dispersion C and the surface pH of the ink-receiving layer was adjusted to 4.7. Using the thus-obtained recording medium (5), its ink absorbency and ink-fixing property were ranked in a similar manner as in Example 3. The results are presented in Table 2.

Comparative Example 3

A recording medium (6) was prepared in a similar manner as in Example 3 except that "PAA-HCL-3L" was not added. Using the thus-obtained recording medium (6), its ink absorbency and ink-fixing property were ranked in a similar manner as in Example 3. The results are presented in Table 2.

Comparative Example 4

A recording medium (7) was prepared in a similar manner as in Example 0.3 except that "XCPP104" was not added. Using the thus-obtained recording medium (7), its ink absorbency and ink-fixing property were ranked in a similar manner as in Example 3. The results are presented in Table 2.

Comparative Example 5

A recording medium (8) was prepared in a similar manner as in Example 3 except that the 0.5N aqueous solution of sulfuric acid was changed to a 1% aqueous solution of sodium hydroxide and the 1% aqueous solution of sodium hydroxide was overcoated to adjust the surface pH of the ink-receiving layer to 7.5. Using the thus-obtained recording medium (8), its ink absorbency and ink-fixing property were ranked in a similar manner as in Example 3. The results are presented in Table 2.

Comparative Example 6

Ink absorbency and ink-fixing property were ranked in a similar manner as in Example 3 except that the ink 1 was replaced by the ink 2. The results are presented in Table 2.

Comparative Example 7

A coating formulation was prepared in a similar manner as in Example 4 except that "XCPP105" was used in an amount of 22.67 parts (40% based on the aluminium hydrate). However, its viscosity was too high to form a satisfactory ink-receiving layer. Accordingly, the ranking of ink absorbency and ink-fixing property was not performed.

TABLE 2

| | Ranking Results | |
|---|---|---|
| | Ink absorbency | Ink-fixing property |
| Example 3 | A | A |
| Example 4 | A | A |
| Example 5 | A | A |
| Comp. Ex. 3 | B | B |
| Comp. Ex. 4 | C | C |
| Comp. Ex. 5 | D | D |
| Comp. Ex. 6 | C | D |
| Comp. Ex. 7 | — | — |

Example 6

A coating formulation was prepared by combining a mixture of the aluminium hydrate dispersion B (100 parts, solid content: 17%), magnesium acetate tetrahydrate (product of Kishida Chemical Co., Ltd.; 1.36 parts (8% based on the aluminium hydrate)) and a 3% aqueous solution of boric acid (17.0 parts; 3% based on the aluminium hydrate) with a solution of polyvinyl alcohol ("PVA-235", trade name; product of Kuraray Co., Ltd.; 1.7 parts) in water (15.3 parts). The coating formulation was next applied to a polyethylene-coated paper (60-deg. specular gloss of the surface to be coated as measured by JIS Z 8741: 64%) by die coating to give a dry coat weight of 35 g/m². In an oven (manufactured by Yamato Scientific Co., Ltd.), the thus-coated paper was then dried with hot air at 100° C. for 15 minutes to form an ink-receiving layer. Further, a 0.5 N aqueous solution of sulfuric acid was overcoated on the ink-receiving layer by the bar coating method such that the pH of the surface of the ink-receiving layer was adjusted to 3.5 to afford a recording medium (9).

Next, evaluation of the image recording method according to the present invention was conducted by the following methods:

<Ranking of Ink-fixing Property>

Ink-fixing property was ranked in a similar manner and in accordance with similar ranking standards as in Examples 1–2. However, the recording medium (9) was used as a recording medium, and the left-over time after the printing was changed to 1 hour. The results are presented in Table 3.

Example 7

A recording medium (10) was prepared in a similar manner as in Example 6 except that the aluminium hydrate dispersion B was replaced by the aluminium hydrate dispersion C, magnesium acetate was replaced by magnesium sulfate (product of Kishida Chemical Co., Ltd.), magnesium sulfate was added in an amount, of 0.51 part (3% based on the aluminium hydrate), and the surface pH of the ink-receiving layer was adjusted to 4.7. Ink-fixing property was then ranked in a similar manner as in Example 6 except that the recording medium (9) was changed to the recording medium (10). The results are presented in Table 3.

Comparative Example 8

A recording medium (11) was prepared in a similar manner as in Example 6 except that magnesium acetate was not added. Ink-fixing property was then ranked in a similar manner as in Example 6 except that the recording medium (9) was changed to the recording medium (11). The results are presented in Table 3.

Comparative Example 9

A recording medium (12) was prepared in a similar manner as in Example 6 except that the 0.5 N aqueous solution of sulfuric acid was changed to a 1% aqueous solution of sodium hydroxide and the 1% aqueous solution of sodium hydroxide was overcoated to adjust the surface pH of the ink-receiving layer to 7.5. Ink-fixing property was then ranked in a similar manner as in Example 6 except that the recording medium (9) was changed to the recording medium (12). The results are presented in Table 3.

Comparative Example 10

Ink-fixing property was ranked in a similar manner as in Example 6 except that the ink 1 was replaced by the ink 2. The results are presented in Table 3.

TABLE 3

| | Ranking Results |
|---|---|
| | Fixing property |
| Example 6 | A |
| Example 7 | A |
| Comp. Ex. 8 | B |
| Comp. Ex. 9 | C |
| Comp. Ex. 10 | C |

<Preparation of a High-molecular Dispersant B>

Synthesis of an A-B diblock copolymer formed of one type of hydrophobic blocks and one type of hydrophilic blocks:

A glass vessel fitted with a three-way cock was purged with nitrogen gas, and then, heated at 250° C. under a nitrogen gas atmosphere to remove any adsorbed water. After the system was allowed to cool down to room temperature, isobutyl vinyl ether (12 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and the A blocks of an A-B diblock copolymer was synthesized.

Using a gel permeation column chromatography (GPC), the molecular weight was monitored in a time division manner. Subsequent to the completion of the polymerization of the A blocks, a vinyl monomer (12 mmol) which had been obtained by silylating the hydroxyl group of 2-hydroxyethyl vinyl ether with trimethylchlorosilane was added to conduct synthesis of B blocks. Termination of the polymerization reaction was effected by adding into the system a 0.3% solution of ammonia in methanol.

Hydrolysis of the hydroxyl group silylated with trimethylchlorosilane was conducted by adding water. After completion of the reaction, dichloromethane was added to the reaction mixture to dilute the same. The thus-diluted reaction mixture was washed thrice with 0.6 N hydrochloric acid solution and then, thrice with distilled water. The reaction mixture was concentrated to dryness in an evaporator. The resulting solid matter was dried in vacuo to afford the A-B diblock copolymer (high-molecular dispersant B). Identification of the compound was conducted using NMR and GPC (Mn=3.7×10$^4$, Mn/Mw=1.3). The resultant high-molecular dispersant was tested for its pH stimulation responsibility. It was ascertained to exhibit stimulation responsibility when the pH is lowered to 6.5 or further.

Examples 8 & 9

Formation tests of images were conducted in a similar manner as in Examples 1 and 2, respectively, except that the above-described high-molecular dispersant B was used in placed of the high-molecular dispersant A. Similar results as in Examples 1 and 2 were obtained.

<Preparation of a High-molecular Dispersant C>

Synthesis of an A-B-C triblock copolymer formed of one type of hydrophobic blocks and two types of hydrophilic blocks:

A glass vessel fitted with a three-way cock was purged with nitrogen gas, and then, heated at 250° C. under a nitrogen gas atmosphere to remove any adsorbed water. After the system was allowed to cool down to room temperature, n-octadecyl vinyl ether (12 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and the A blocks of an A-B-C triblock copolymer was synthesized.

Using a column chromatography (GPC), the molecular weight was monitored in a time division manner. Subsequent to the completion of the polymerization of the A blocks, 2-(2-(2-(2-methoxyethoxy)ethoxy)ethoxy)ethoxyvinyl ether (B block) (24 mmol) was added, followed by continuation of polymerization. Using GPC, the molecular weight was monitored likewise. Subsequent to the completion of the polymerization of the B blocks, a vinyl monomer (12 mmol) which had been obtained by esterifying the carboxyl group of 6-(2-vinyloxyethoxy)hexanoic acid (C block) was added to conduct synthesis of C blocks. Termination of the polymerization reaction was effected by adding into the system a 0.3% solution of ammonia in methanol.

The esterified carboxyl group was converted into a carboxyl group by hydrolyzing it with a solution of sodium hydroxide in methanol. After completion of the reaction, dichloromethane was added to the reaction mixture to dilute the same. The thus-diluted reaction mixture was washed thrice with 0.6 N hydrochloric acid solution and then, thrice with distilled water. The reaction mixture was concentrated to dryness in an evaporator. The resulting solid matter was dried in vacuo to afford the A-B-C triblock copolymer (high-molecular dispersant C). Identification of the compound was conducted using NMR and GPC ($Mn=3.7\times10^4$, $Mn/Mw=1.2$). The resultant high-molecular dispersant was tested for its pH stimulation responsibility. It was ascertained to exhibit stimulation responsibility when the pH is lowered to 6.5 or further.

Examples 10–12

Formation tests of images were conducted in a similar manner as in Examples 3–5, respectively, except that the above-described high-molecular dispersant C was used in place of the high-molecular dispersant A. Similar results as in Examples 3–5 were obtained.

<Preparation of a High-molecular Dispersant D>

Synthesis of an A-B diblock copolymer formed of one type of hydrophobic blocks and one type of hydrophilic blocks:

A glass vessel fitted with a three-way cock was purged with nitrogen gas, and then, heated at 250° C. under a nitrogen gas atmosphere to remove any adsorbed water. After the system was allowed to cool down to room temperature, n-octadecyl vinyl ether (12 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and the A blocks of an A-B diblock copolymer was synthesized.

Using a column chromatography (GPC), the molecular weight was monitored in a time division manner. Subsequent to the completion of the polymerization of the A blocks, a vinyl monomer (48 mmol) which had been obtained by silylating the hydroxyl group of heptaethylene glycol vinyl ether with trimethylchlorosilane was added to conduct synthesis of B blocks. Termination of the polymerization reaction was effected by adding into the system a 0.3% solution of ammonia in methanol.

Hydrolysis of the hydroxyl group silylated with trimethylchlorosilane was conducted by adding water. After completion of the reaction, dichloromethane was added to the reaction mixture to dilute the same. The thus-diluted reaction mixture was washed thrice with 0.6 N hydrochloric acid solution and then, thrice with distilled water. The reaction mixture was concentrated to dryness in an evaporator. The resulting solid matter was dried in vacuo to afford the A-B diblock copolymer (high-molecular dispersant D). Identification of the compound was conducted using NMR and GPC ($Mn=3.5\times10^4$, $Mn/Mw=1.3$). The resultant high-molecular dispersant was tested for its pH stimulation responsibility. It was ascertained to exhibit stimulation responsibility when the pH is lowered to 6.5 or further.

Examples 13 & 14

Formation tests of images were conducted in a similar manner as in Examples 6 and 7, respectively, except that the above-described high-molecular dispersant D was used in placed of the high-molecular dispersant A. Similar results as in Examples 6 and 7 were obtained.

INDUSTRIAL APPLICABILITY

To form an image, an ink is caused to adhere on a recording medium which is provided with at least one ink-receiving layer on a base material. According to the present invention, the ink is an inkjet recording ink, which is composed of a high-molecular dispersant, a water-insoluble colorant, a water-soluble organic solvent and water. The high-molecular dispersant contains at least one hydrophobic block and at least one hydrophilic block. The ink-receiving layer contains fine inorganic particles and a water-soluble resin and/or water-dispersible resin (and optionally, other components), and a surface pH of the ink-receiving layer is controlled within a range of from 3.0 to 6.5. The use of the inkjet recording ink and recording medium has made it possible to provide an image recording method excellent in ink absorbency and ink-fixing property.

The invention claimed is:

1. An image recording method for causing an ink to adhere on a recording medium, which is provided with at least one ink-receiving layer on a base material, to form an image, characterized in that said ink is an inkjet recording ink composed of a high-molecular dispersant formed of a block copolymer comprising at least one hydrophobic block and at least one hydrophilic block, a water-insoluble colorant, a water-soluble organic solvent and water, wherein said water-insoluble colorant is at least one of an oil-soluble dye or a vat dye; and said ink-receiving layer comprises fine inorganic particles and at least one of a water-soluble resin or water-dispersible resin, and a surface pH of said ink-receiving layer is controlled within a range of from 3.0 to 6.5, wherein said fine inorganic particles are made of at least one selected from the group consisting of aluminum hydrate of the boehmite structure and aluminum hydrate of the pseudo-boehmite structure each of which has an average particle size of from 100 to 300 nm.

2. An image recording method according to claim 1, wherein said ink-receiving layer further comprises cationic fine organic particles and a cationic polymer.

3. An image recording method according to claim 2, wherein a content of said cationic fine organic particles in said ink-receiving layer is from 0.1 to 25 wt. % based on a dry weight of said ink-receiving layer.

4. An image recording method according to claim 2, wherein a weight average molecular weight of said cationic fine organic particles is from 100,000 to 1,000,000.

5. An image recording method according to claim 2, wherein said cationic fine organic particles have a glass transition temperature of from 60 to 110° C.

6. An image recording method according to claim 2, wherein a weight average molecular weight of said cationic polymer is from 5,000 to 200,000.

7. An image recording method according to claim 2, wherein said cationic polymer is used in a proportion of from 0.05 to 5 wt. % based on said fine inorganic particles.

8. An image recording method according to claim 1, wherein said ink-receiving layer further comprises a water-soluble multivalent metal salt.

9. An image recording method according to claim 8, wherein said water-soluble multivalent metal salt is used in a proportion of from 0.1 to 10 wt. % based on said fine inorganic particles.

10. An image recording method according to claim 1, wherein said hydrophilic block is a polymer of a vinyl ether having at least one carboxyl group.

11. An image recording method according to claim 1, wherein said high-molecular dispersant is a block copolymer obtained by polymerizing vinyl ethers as monomers, and has pH stimulation responsibility such that high molecular chains of said block copolymer can undergo association when a pH of said ink is lowered.

12. An image recording method according to claim 1, wherein at least one of said monomers which make up said block copolymer is at least one monomer selected from vinyl ethers represented by the following formulas (I-a) to (I-o):

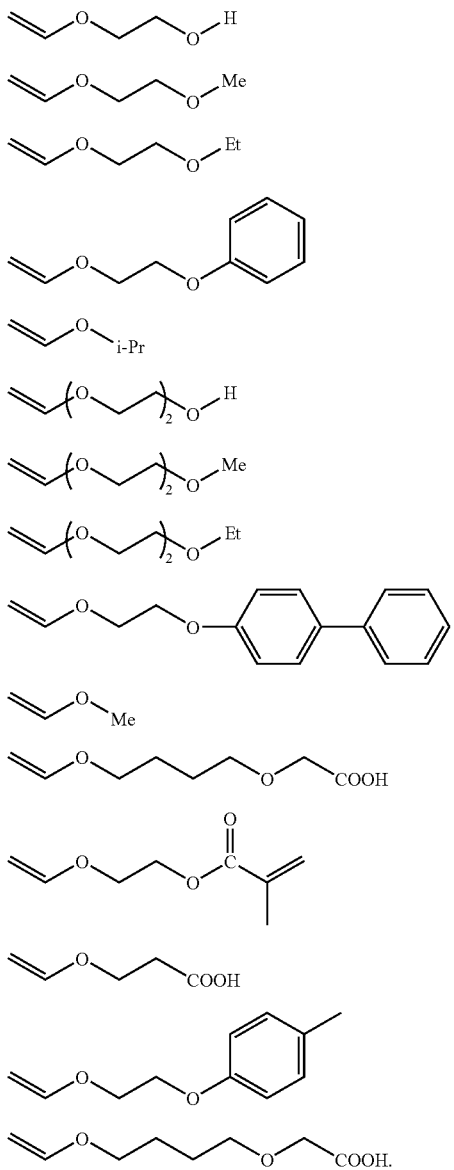

13. An image recording method according to claim 1, wherein said block copolymer is at least one block copolymer selected from the block copolymers represented by the following formulas (II-a) to (II-e):

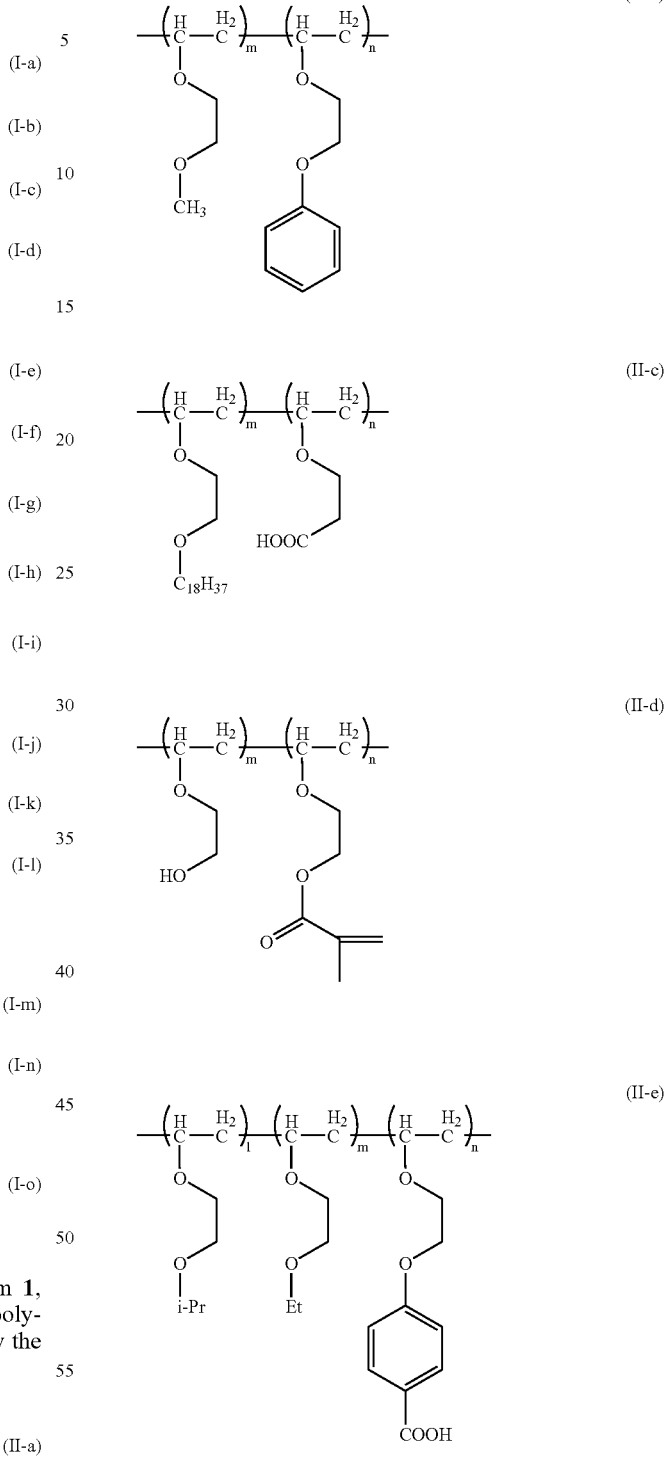

wherein m, n and l each independently denotes a value of from 1 to 10,000.

14. An image recording method according to claim 1, wherein a number average molecular weight of said block copolymer is from 500 to 20,000,000.

* * * * *